United States Patent [19]
Satoh

[11] Patent Number: 5,337,130
[45] Date of Patent: Aug. 9, 1994

[54] EXPOSURE CONTROL METHOD FOR PHOTOGRAPHIC PRINTING

[75] Inventor: Yasuaki Satoh, Hino, Japan

[73] Assignee: Konica Corporation, Tokyo, Japan

[21] Appl. No.: 919,908

[22] Filed: Jul. 27, 1992

[30] Foreign Application Priority Data

Aug. 9, 1991 [JP] Japan ................... 3-200672

[51] Int. Cl.⁵ ................ G03B 27/32; G03B 27/80
[52] U.S. Cl. .................................. 355/77; 355/38
[58] Field of Search ................ 355/32, 38, 68, 77

[56] References Cited

U.S. PATENT DOCUMENTS

| | | | |
|---|---|---|---|
| 3,724,947 | 4/1973 | Paulus | 355/38 |
| 4,099,862 | 7/1978 | Bickl et al. | 355/35 |
| 4,416,539 | 11/1983 | Terashita | 355/77 |
| 4,492,458 | 1/1985 | Bickl et al. | 355/38 |
| 4,641,959 | 2/1987 | Terashita | 355/77 |
| 4,707,118 | 11/1987 | Terashita | 355/38 |
| 4,757,351 | 7/1988 | Birgmeir | 355/38 |
| 5,016,043 | 5/1991 | Kraft et al. | 355/38 |
| 5,029,312 | 7/1991 | Goenner | 355/38 |
| 5,223,892 | 6/1993 | Ikenoue et al. | 355/77 |

*Primary Examiner*—D. Rutledge
*Attorney, Agent, or Firm*—Frishauf, Holtz, Goodman & Woodward

[57] ABSTRACT

In an exposure control method for photographic printing, average transmitted light from an original on an photographic film is color-separated, and an average photometric value for each color is obtained by measuring each color-separated light. A tentative exposure amount is determined based on the average photometric value. A color dominancy in the original image is evaluated by an analysis of image information which is obtained through a color-separated scanning of the original image, and the tentative exposure amount is corrected based on an evaluation result.

7 Claims, 8 Drawing Sheets

FIG. 3

| G | B | R | G | B | R |
|---|---|---|---|---|---|
| G | B | R | G | B | R |
| G | B | R | G | B | R |
| G | B | R | G | B | R |

EXPOSURE CONTROL METHOD FOR PHOTOGRAPHIC PRINTING

BACKGROUND OF THE INVENTION

The present invention relates to a method for controlling an exposure amount when printing an original image of a photographic film on a photographic paper. The invention relates more particularly to an exposure control method for photographic printing wherein an original image on a photographic film is scanned, consequent image information obtained from the scanning is analyzed, and an exposure amount based on an average photometric value of transmitted light is properly corrected by the results of the analyses so that satisfactory photographic prints may be made stably and easily.

In ordinary photographing, it is a known empirical principle that the average reflectance for each of the three primary colors, blue (B), green (G) and red (R) of a subject (hereinafter referred to simply as B, G and R) is almost constant. In a conventional photographic printing apparatus, therefore, large area transmission density (LATD) of a photographic original image has been measured, and an exposure amount for photographic printing has been determined based on the measured LATD (hereinafter referred to as an LATD method). When a film on which a standard subject is photographed is used for printing, it is possible to obtain photographic prints having excellent color balance by keeping an exposure amount for each of B, G and R light-sensitive layers of a photographic paper constant by means of the above-mentioned exposure control method.

However, when a subject has its own bias in its brightness distribution or its color distribution (which is called a subject failure), it is difficult to obtain satisfactory photographic prints through the above-mentioned LATD method. A subject failure wherein a bias of brightness distribution of a subject is remarkable is called a density failure and a subject failure wherein a bias of color distribution is remarkable is called a color failure.

As known technology to correct an exposure amount for the density failure, Japanese Patent Examined Publication No. 2691/1981 may be cited. In this technology, an original image on a photographic film is scanned, and from the image density obtained from the scanning, "specific values for location and density" are obtained for each region on the image. Then, classification in terms of the specific values is made, and a function of predetermined specific values may adjust, together with the aforesaid classification, the exposure amount for the original image.

On the other hand, as known technology to correct an exposure amount for the color failure, "Exposure Determination Methods for Color Printing: The concept of Optimum Correction Level" written by C.J. Bartleson and R.W. Huboi and J. of SMPTE, 65, 205-215 (1956), for example, may be cited.

This paper contains the following descriptions.

①  Full correction in which the exposure is adjusted depending on LATD and thereby an exposure amount for the light-sensitive layer of each color is made constant, is effective for photographic originals of photographed standard subjects.

②  No correction in which an exposure is conducted under the condition of a constant light flux or a constant exposure time is effective, for a subject failure in the case of optimum exposure for photographing.

Further, the following point is described in the paper as an actual compromise.

③  A lowered correction that is a control method positioned between the above-mentioned ① and ② is suitable, and the optimum correction level should be selected from overall print quality for the entire population.

In a recent photographic printing apparatus, in general, correction levels of several steps can be selected, and an operator who observes photographic originals can select the correction level for each original so that he may adjust a color balance. Furthermore, for the selection of the correction level, when lighting for photographing is improper or the original is affected by latent-image decay, the full correction is suitable, and when a subject is biased in terms of colors, the lowered correction is usually considered optimum.

In "Modern Exposure Determination for Customizing Photofinishing Printer Response", JAPE, 5, 93-104 (1979), there is suggested an exposure determination method for adjusting the correction level by paying attention to hue, because the influence of color temperature of lighting for photographing is remarkable for the specific hue in chromaticity computed by the use of an average density of a photographic original. However, there is no big difference of chromaticity obtained from the average density, between, for example, a photographic original made through photographing under a fluorescent light and a photographic original of a green lawn. Therefore, it is difficult to discriminate between them based on their hues.

As mentioned above, the selection of a correction level by means of an average density is not always effective. In a photographic printing apparatus of an LATD control system, it is also impossible to discriminate automatically whether density variation of each color of B, G and R of a photographic original is caused by a tone reproduction characteristic of a photographic film or by a bias of color distribution of a subject. In photographic printing apparatus of this type, therefore, appropriate conditions for exposure are established in advance for each type of photographic film, and exposure conditions are selected through switching based on the type of photographic film used for printing.

Recently, however, the number of types of photographic films has been greatly increased. Therefore, establishment of exposure conditions for each type of film and the switching operation for selecting the exposure conditions mentioned above are major factors impeding enhancement of efficiency in the photographic printing process. Further, even in the same type of photographic film, exposure conditions established in advance sometimes do not provide photographic prints having a proper color balance for photographic originals whose characteristics have been deteriorated because of improper storage conditions of the film after photographing. Existence of such film is also a serious obstacle for stable and efficient production of photographic prints having constant quality.

For the problems mentioned above, Japanese Patent Publication Open to Public Inspection No. 46741/1980 (hereinafter referred to as Japanese Patent O.P.I. Publication) discloses a method wherein a photographic film is color-separated into three primary colors to be scanned, neutral density and two sets of density differences between two colors are obtained based on image density of each color obtained through the scanning, a value specific to the photographic film is obtained from the relation of functions of the neutral density and two sets of density differences mentioned above, thus the specific value is used for exposure control.

In addition to the above, Japanese Patent O.P.I. Publication No. 6939/1990 discloses a method wherein a plurality of photographic originals are color-separated to be scanned, a cumulative distribution function of the image density obtained through the scanning for each color is obtained, and an exposure amount is determined based on the function mentioned above.

In the aforementioned exposure determination methods, however, it is not possible to discriminate whether the density variation for each of B, G and R colors of a photographic original is caused by photographing lighting or by color distribution on a subject both differing for each photographic original, though it is possible to discriminate whether the density variation for each of B, G and R colors of a photographic original is caused by a tone reproduction characteristic of a photographic film or by color distribution on a subject. Therefore, the above-mentioned exposure determination methods can not be free from the problem that it is not possible to obtain photographic prints having excellent quality from photographic originals obtained through photographing under improper lighting.

Furthermore, in the examples mentioned above, an exposure amount is determined based on image density information obtained through scanning by means of an image sensor. However, the sensitometric dynamic range for ordinary image sensors represented by a CCD is narrow for the extremely broad density range of a photographic film, which is a disadvantage. Therefore, it is difficult to determine, with high reproducibility, an exposure amount for a photographic original by scanning accurately and stably the density of the photographic original with the image sensors mentioned above.

In order to broaden a sensitometric dynamic range, on the other hand, it is necessary to arrange, in the form of a line or a plane, photoelectric conversion elements each having a large light-receiving area, which is extremely expensive. There is further a problem that the image sensor having a large external dimension can not be free from a large scale image pickup system including an image forming optical system and a color separation means. In addition to that, signal processing for output from a plurality of image sensors at a high speed and at a high S/N ratio requires a complicated and expensive circuit construction, which is a disadvantage.

In the methods mentioned above, it is necessary to determine an exposure amount by scanning, in advance, a photographic original prior to the exposure. Therefore, there is required an apparatus construction in which a scanning section and an exposure section are separated. However, such separated construction causes great inconvenience in the case of reprinting and print remaking. That is, reprinting or print remaking is on the assumption that photographic prints made therein should be the same as those obtained in the initial printing. Therefore, the image pickup system used for the initial printing should be used again for scanning of the photographic original in reprinting or print remaking. However, it is not easy to scan a shortcut film continuously for exposure, and both a scanning unit and an exposure unit require a light source and a film conveyance system. In addition to that, the control of conveyance of photographic films can not be free from complication. Therefore, an apparatus that materializes the aforesaid method tends to be extremely expensive, which is a problem.

Further, illumination light to a photographic original in an exposure system varies due to an aging change of a light source and an optical system, or a dye image of the photographic original is deteriorated by radiant heat generated during illumination for exposure. In that case, it is substantially impossible to detect the variation and adjust an exposure amount in equipment wherein a scanning unit and an exposure unit are separated in terms of space and time. Consequently, it is not possible to avoid a difference between the finish of prints in the initial printing and that of prints in reprinting or print remaking, which is a disadvantage.

SUMMARY OF THE INVENTION

The present invention has been accomplished in view of the foregoing and its object is to provide an exposure control method for photographic printing that is capable of offering photographic prints having excellent quality independently of lighting used in photographing for preparing a photographic original.

A further object of the invention is to provide an exposure control method for photographic printing wherein the structure of the apparatus is simple, exposure conditions depending upon the type of photographic film need neither be established nor changed, and photographic prints having constant quality can be produced stably and efficiently in spite of characteristic deterioration caused by improper latent-image-keeping conditions, variation of illumination light in an exposure system and deterioration caused by exposure.

Furthermore, the invention is intended to provide an exposure control method for photographic printing wherein an exposure amount for a photographic original can be determined with high reproducibility even when the photographic original is scanned by a simple and inexpensive image pickup system and reprinting and print remaking can easily be performed.

In an exposure control method for photographic printing wherein average transmitted light of an original on a photographic film is color-separated for obtaining an average photometric value of each color and an exposure amount for printing is controlled by the average photometric value, the invention for achieving the objects mentioned above is characterized in that analysis and evaluation, both related to adjustment of color balance are conducted based on image information of each color obtained by color-separating and scanning the aforementioned original, and the exposure amount for photographic printing mentioned above is properly corrected by the results of the aforementioned evaluation, thus an exposure amount can be corrected based on a color dominancy related to dominating nature of a specific color of a subject.

In the invention, it is further possible to evaluate through high capability of color-separation and a broad dynamic range by combining the aforementioned analysis and evaluation for adjustment of a color balance with the evaluation based on the average photometric value of each color mentioned above.

In an exposure apparatus for photographic printing, an average transmitted light of a photographic original on a film irradiated by illumination light for exposure is color-separated for obtaining an average photometric value of each color, and the original is also subjected to color-separation and scanning both conducted by CCD for obtaining image information of each color.

First, an exposure amount corresponding to a full correction of LATD control is determined based upon an average photometric value of each color.

Next, a histogram corresponding to image density for each color is obtained by the use of image information of each color, and then a cumulative distribution function (CDF) thereof is computed. From an inverse function of CDF, its correlation coefficient is obtained, and also obtained is a color dominance level. The color dominance level in a measure for judging whether the dominating nature of a specific color of the original is caused by the type of film, latent-image-keeping conditions and a light source for photographing, or it is caused by the bias of color distribution of a subject itself. Then, the color dominance level is converted to a proper correction level by means of a look-up table stored in advance, and thereby the exposure amount corresponding to a full correction determined previously is corrected so that a final exposure amount is determined.

For a more precise evaluation, chromaticity, saturation or hue obtained from image information, or chromaticity, saturation or hue obtained from an average transmitted light photometric value are used according to the circumstances.

BRIEF DESCRIPTION OF THE DRAWINGS

FIG. 3 is a structural diagram of a color-separation filter.

DETAILED DESCRIPTION OF THE PREFERRED EMBODIMENT

Figure 1:
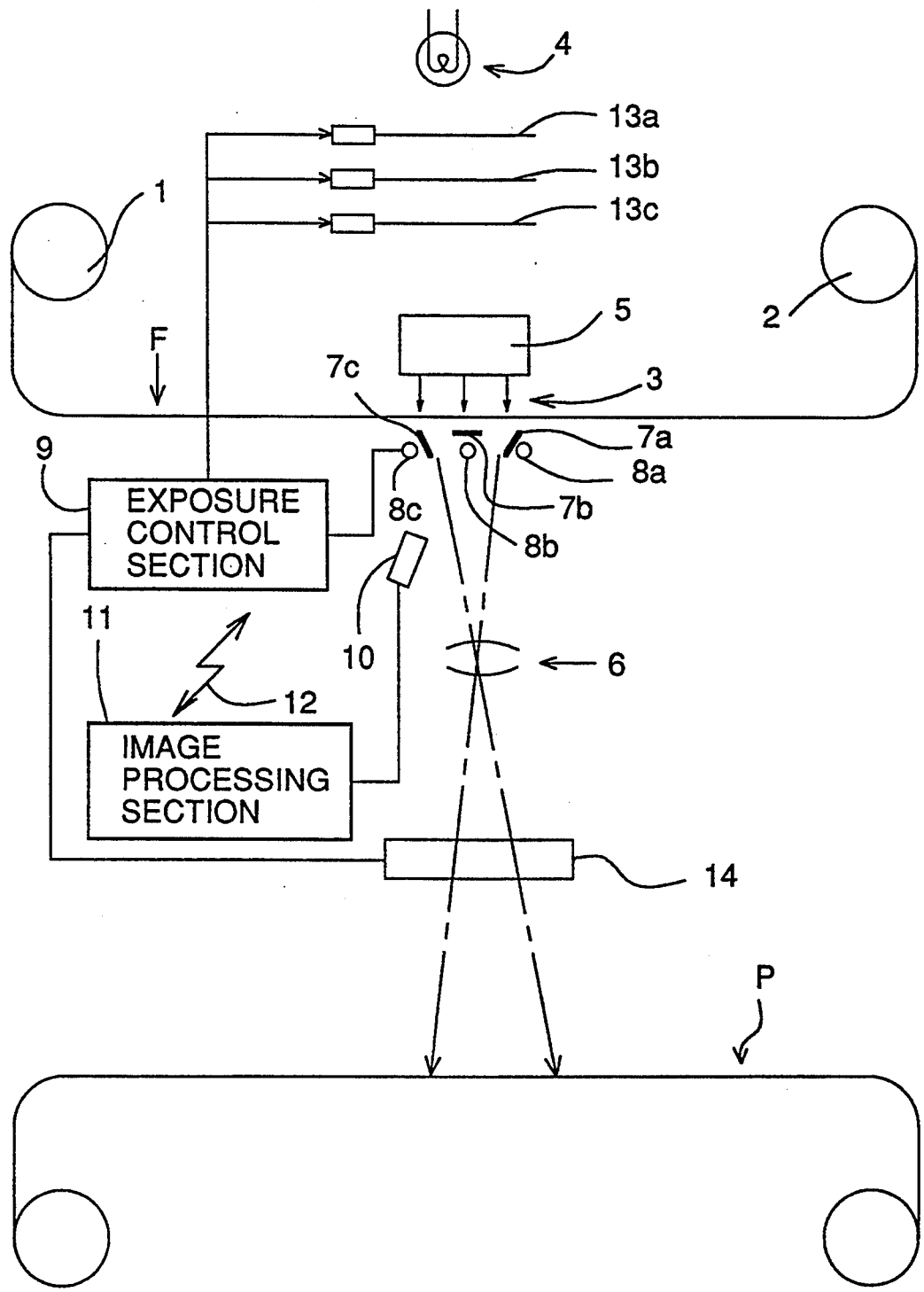
FIG. 1 is a principle diagram showing general construction of a photographic printing apparatus.

The invention will be explained as follows, referring to an example shown in the drawings attached hereto.

FIG. 1 is a principle diagram showing general construction of a photographic printing apparatus.

In the drawing, the symbol F represents a photographic film and the photographic film F is set on spool 1 and is guided through a predetermined conveyance path to the second spool 2 where it is taken up.

Photographic original I formed on the photographic film F is positioned at exposure portion 3, subjected to irradiation by light source 4 through the light mixer 5. Then, an image of the original is formed optically on photographic paper P by means of lens 6 through exposure.

An average transmitted light of each color among colors of B, G and R of the aforesaid original I is received by each of photodiodes 8a, 8b and 8c through each of photometric filters 7a, 7b and 7c for colors of B, G and R. A photometric signal of each of colors B, G and R obtained through photoelectric conversion of the aforesaid received light is supplied to exposure control unit 9 and then is subjected to A/D conversion. Thereby, an exposure amount is determined in exposure control unit 9 based on the average photometric value of each of B, G and R colors, as stated later.

The original image I formed on photographic film F at the aforesaid exposure location 3 is color-separated and scanned by image pickup unit 10 into colors of B, G and R. Image signals of each color of B, G and R obtained in image pickup unit 10 are sent to image processing unit 11 where they are subjected to A/D conversion to be arranged to image density information of a predetermined form. In the image processing unit 11, an exposure correction parameter is computed through a method stated later and the exposure correction parameter thus obtained is sent to exposure control unit 9 through communication line 12.

At exposure control unit 9, an exposure amount determined based on the above-mentioned large area transmission density is corrected based upon the exposure correction parameter sent from the image processing unit 11. Further in the exposure control unit 9, the exposure amount thus obtained is converted to the operation time for subtractive cut filters 13a, 13b and 13c for yellow (Y), magenta (M) and cyan (C) located at the upper portion of exposure section 3 and for shutter 14 located at the lower portion in the exposure section 3. Based on the operation time, cut filters 13a, 13b and 13c as well as shutter 14 are inserted in the optical path for exposure, thus the exposure for light-sensitive layer for each color on photographic paper P is adjusted. After the completion of this exposure, photographic paper P is transported a predetermined distance for the following exposure and photographic film F is transported so that photographic original I to be subjected to the following printing may be positioned at exposure section 3.

In the aforesaid manner, originals I formed on photographic film F are subjected to the printing process in succession.

Figure 2:
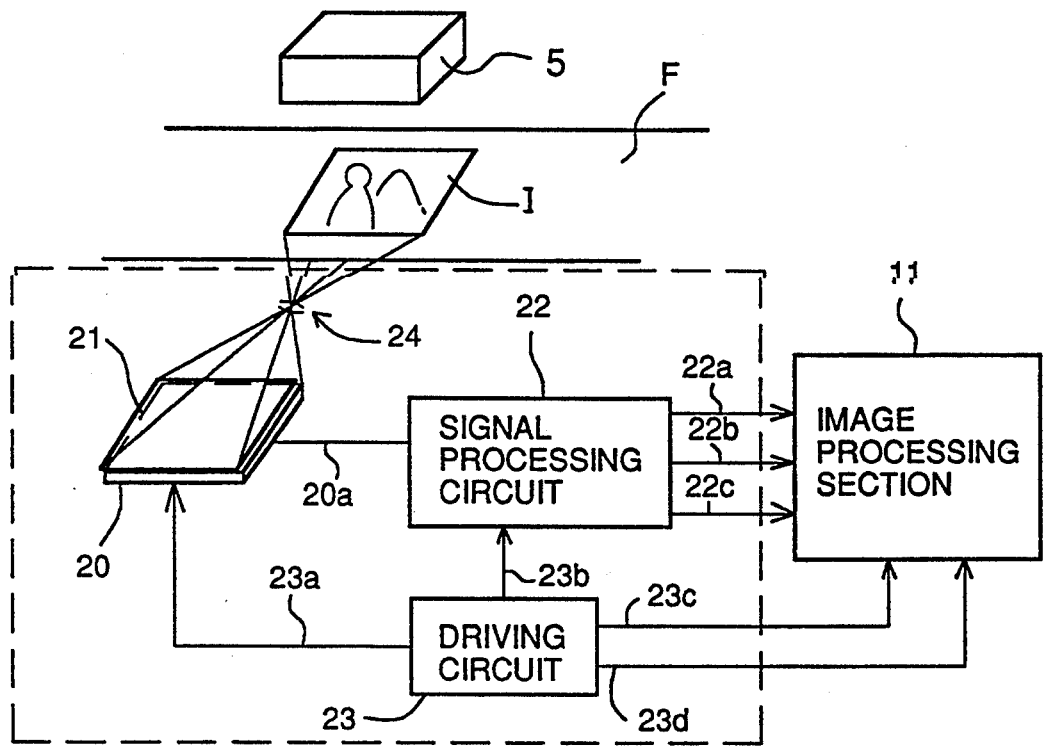
FIG. 2 is a block diagram showing the internal construction of an image pickup unit.

FIG. 2 is a block diagram showing the internal construction of image pickup unit 10.

Figure 3:
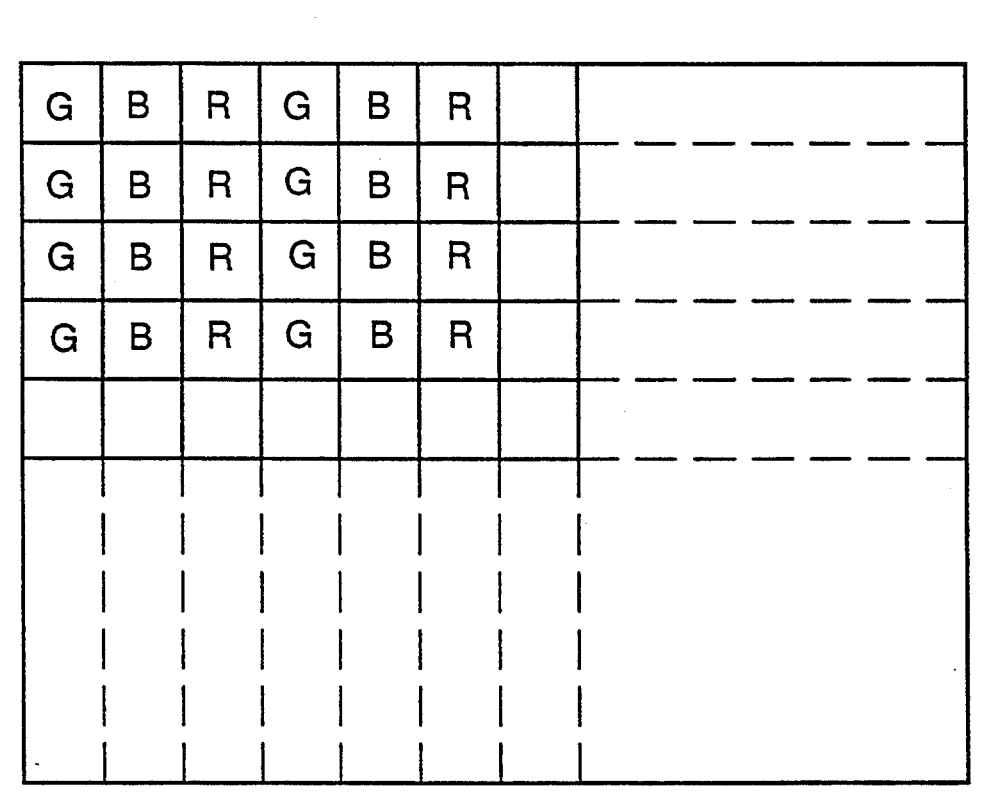

Original I irradiated by the light mixer 5 at exposure location 3, and is projected optically on two-dimensional image sensor 20 by means of image pickup lens 24. On the two-dimensional image sensor 20, there is placed color-separation filter 21 for B, G and R in a form of a stripe corresponding to each column of photoelectric conversion elements as shown in FIG. 3, and charges accumulated in the photoelectric conversion element may be read successively in the direction making a right angle with the stripe. As a result, mixed image signals including those related to B, G and R are generated from the two-dimensional image sensor 20.

Image signals 20a thus obtained are separated into B, G and R colors in signal processing circuit 22, and image signals separated in terms of color are subjected to sample-and-hold action and amplified. Amplified image signals 22a, 22b and 22c each representing B, G and R are sent to image processing unit 11. From driving circuit 23, there are supplied clock signals 23a for driving two-dimensional image sensor 20, timing signals 23b for conducting color separation at signal processing circuit 22 as described above and horizontal synchronizing signals 23c as well as vertical synchronizing signals 23d both for conducting A/D conversion and control of writing to image memory at image processing unit 11.

Figure 4:
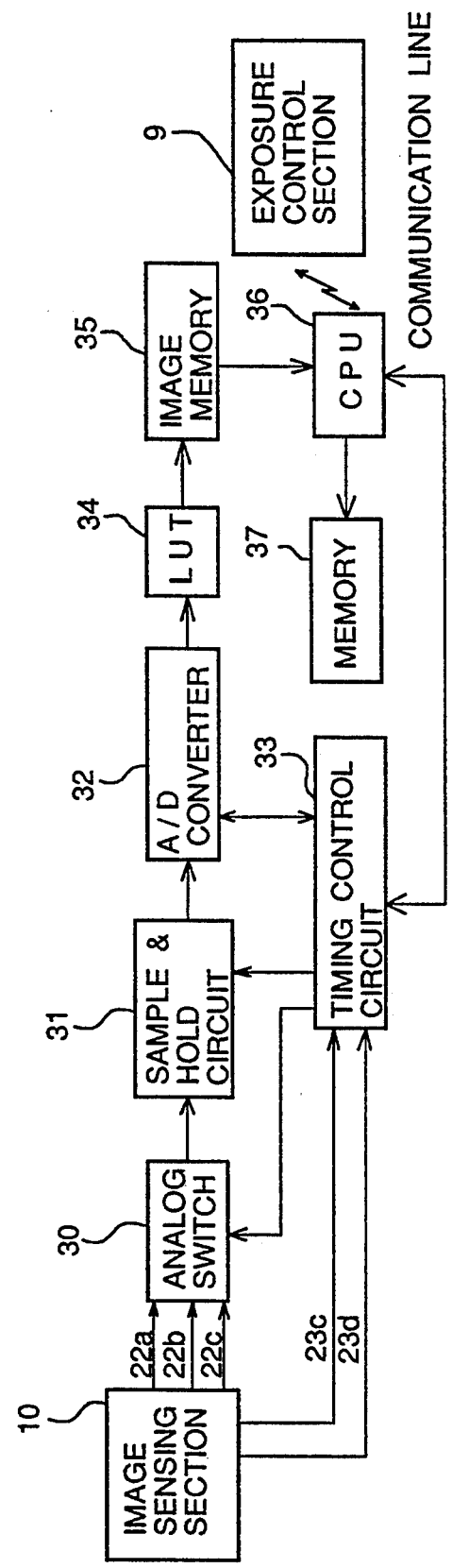
FIG. 4 is an illustration showing the detailed structure of an image processing unit and FIG. 5 is a flow chart of internal processing of the image processing unit.

FIG. 4 shows the detailed construction of image processing unit 11. In the image processing unit 11, the following signal processing is conducted.

Image signals 22a, 22b and 22c supplied from image pickup unit 10 are selected by analog switch 30. Then the signals are sampled by sample-and-hold circuit 31 and converted to digital signals by A/D converter 32. Timing for switching of image signals 22a, 22b and 22c at analog switch 30 and for sampling by sample-and-hold circuit 31 is controlled by timing control circuit 33 based on horizontal synchronizing signals 23c and vertical synchronizing signals 23d.

In this case, the sampling number is 128 per one horizontal scanning for each color of B, G and R, and such sampling is conducted at the rate of 128 horizontal scannings per one vertical scanning. Therefore, digital image information of 128×128 pixels per one vertical scanning can be obtained for each of B, G and R colors. Incidentally, A/D conversion is processed with 10 bits.

Digitized image signals are converted to density values through LUT (look-up table) consisting of ROM and others, and stored in image memory 35. A conversion table represented by the following formula (1) is stored in LUT 34.

$$Y = a \times \log(X + b) \quad (1)$$

In the above formula, X represents input for LUT 34 and Y represents its output. On the other hand, a is a constant with which photometric density determined by spectral sensitivity of image pickup unit 10 is converted to printing density determined by spectral sensitivity of a photographic paper, and b is a constant for cancelling dark current effect in the image pickup.

For the aforementioned LUT 34, a plurality of conversion tables obtained by substituting several values for the constants a and b in the formula (1) are prepared and they can be selected by CPU 36 in advance. The conversion table to be selected does not always need to be the same for all of B, G and R colors.

In the manner mentioned above, image density information of 10 bits consisting of 128×128 pixels for each color of B, G and R can be stored in image memory 35. The image density information stored in the image memory 35 is called primary image density information. Incidentally, address control in storing the image density information into image memory 35 is performed by the timing control circuit 33 synchronized with the horizontal synchronizing signals 23c and the vertical synchronizing signals 23d both generated from image pickup unit 10.

In this case, however, there is a problem that an image region which is effective for image density information differs depending upon the format (frame size) of photographic film F. Therefore, CPU 36 conducts a rounding (simplifying) processing to cover the image region established in advance based on a format of the photographic film F with a reduced number of pixels. Herein-after, the pixels obtained through the rounding processing are called "secondary pixels" and image information carried by the secondary pixels is called secondary information. In the present example, the number of secondary pixels is 16×16 independently of the format of photographic film F. With regard to a method for establishing an effective image region and the secondary pixels, those suggested by the inventors of the invention in Japanese Patent O.P.I. Publication No. 260474/1987 may be used.

When an arithmetic mean of image density information is used for obtaining image density information for each secondary pixel in the rounding processing, noise supression in image signals can be expected. However, the rounding processing does not necessarily need to be conducted for all pixels in the selected image region. A method of employing an arithmetic mean after thinning pixels or a method of thinning the predetermined number of pixels only without using an arithmetic mean may be used for improving computing speed.

Through the aforementioned image processing, secondary image density information consisting of a predetermined number of pixels, 16×16 pixels in this particular case, without depending on the format of photographic film F can be obtained. This secondary image density information is stored in memory 37.

Next, internal processing in image processing circuit 11 will be explained.

Figure 5:
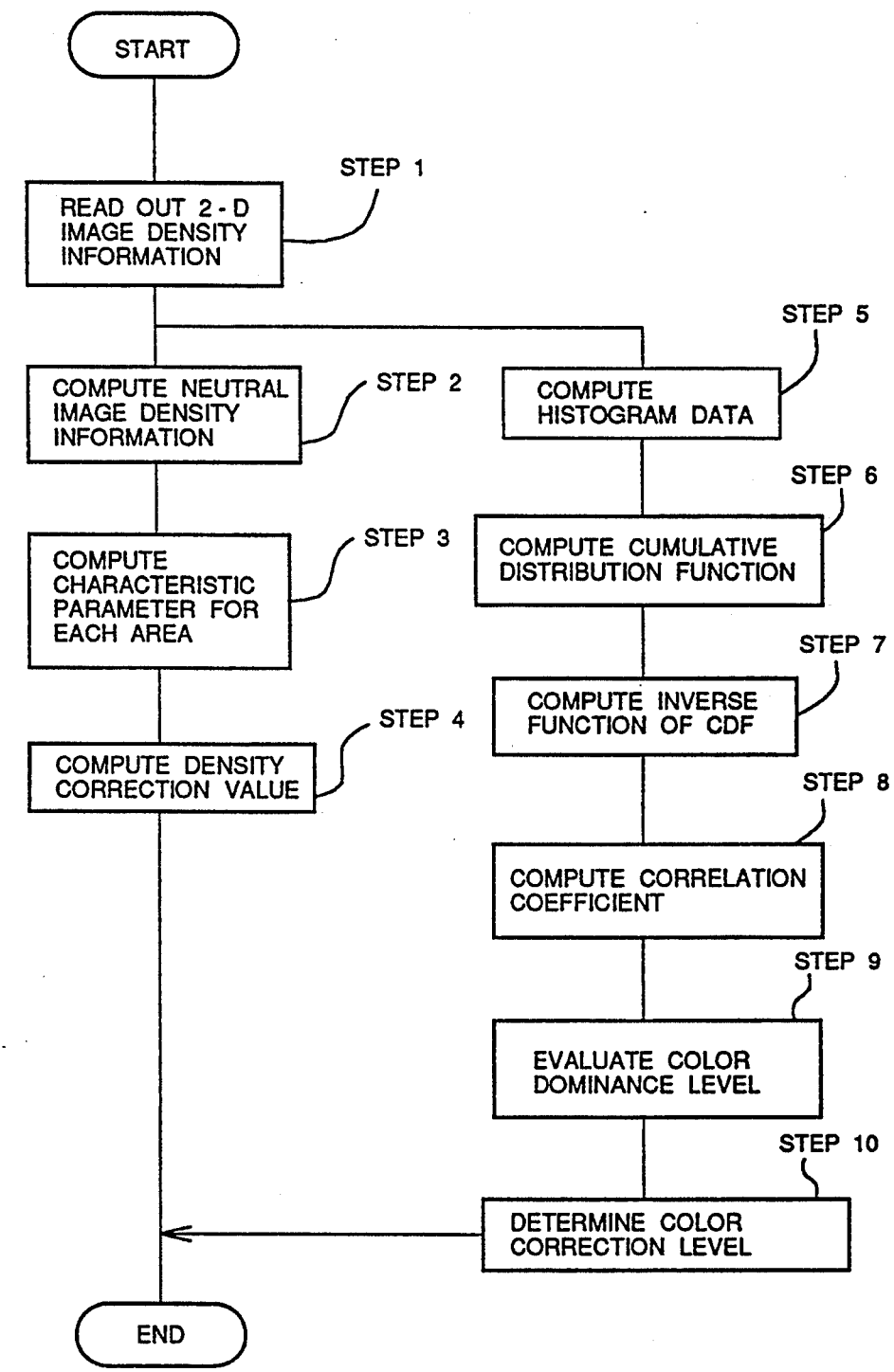

FIG. 5 is a flow chart of internal processing in the image processing circuit.

In FIG. 5, secondary image density information for each of B, G and R colors is taken out from image memory 37 in step 1 first, and is set to a variable $X_k$ (i, j), wherein i and j represent a pixel position and k represents each of B, G and R colors.

In step 2, neutral 2-D image density information D (i, j) is computed from secondary image density information of each of B, G and R colors as an average value of the following formula (2).

$$D(i, j) = \{X_B(i, j) + X_G(i, j) + X_R(i, j)\}/3 \quad (2)$$

In step 3, characteristic parameter D' (m, n) for each region is computed by the use of D (i, j). In this case, m is an index corresponding to each position of 2-D image density information, for example, such as an upper position, a lower position or a position on the right, or on the left or at the center or to the whole region. On the other hand, n is an index corresponding to the maximum value, the minimum value or an average value on each region, for example.

For example, when an average value for 9 pixels located at the upper portion on the left side of an image screen is used as the characteristic parameter D' (m, n), D' takes the following expression (3) on conditions that m=UL (upper left) and n=AVE (average value).

$$D'(UL, AVE) = \sum_{i=0}^{2} \sum_{j=0}^{2} D(i, j)/9 \quad (3)$$

In step 4, density correction value D'' for each original can be obtained from the linear expression shown below by the use of characteristic parameter D' (m, n).

$$D'' = \sum_m \sum_n \alpha(m, n) \times D'(m, n) + \beta \quad (4)$$

In the above expression, $\alpha$ (m, n) is a coefficient established in advance and $\beta$ is a constant.

In step 5, histogram $f_k$ (s) of the secondary image density information relating to each of B, G and R colors is computed. In this case, s represents image density and k represents each of B, G and R colors.

Figure 6A:
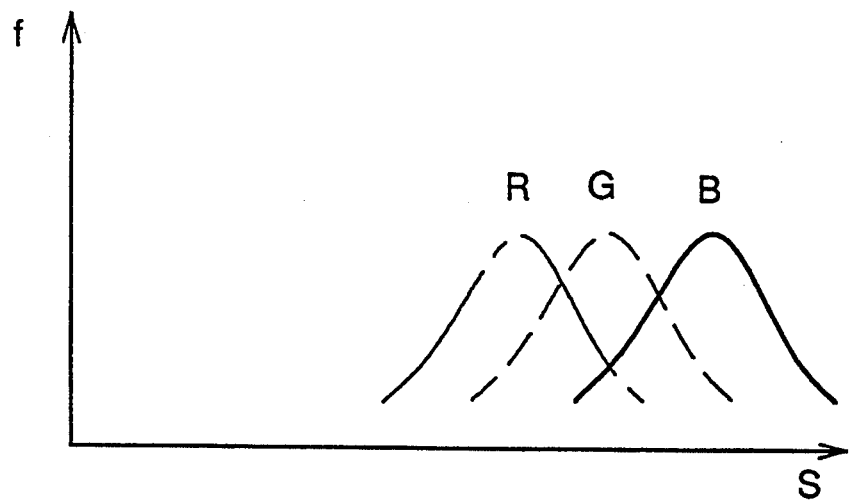
FIG. 6 is a histogram showing image density frequency for each color.
Figure 6B:
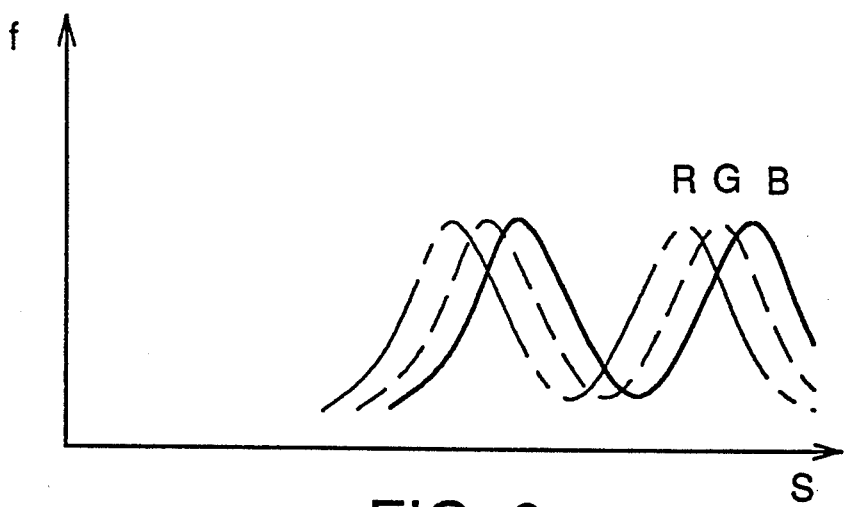
Figure 6C:
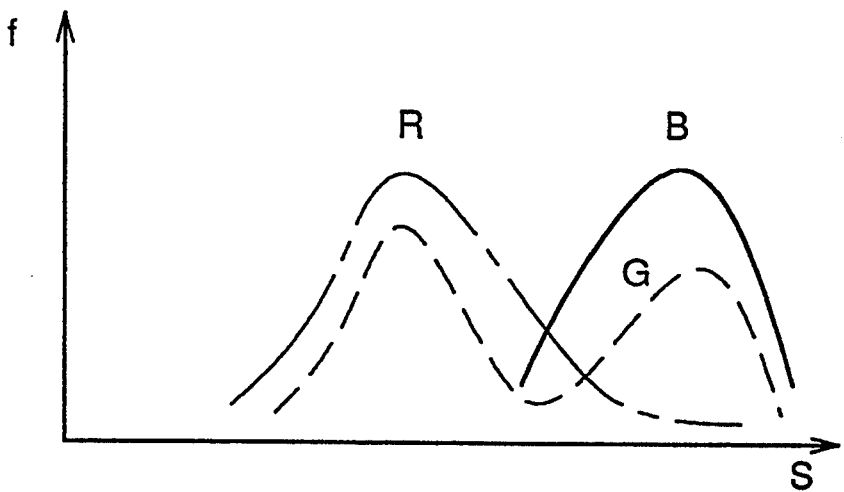

An example of the histogram obtained in step 5 is shown in FIG. 6 wherein the abscissa represents image density s, while the ordinate represents its frequency f.

The histogram thus obtained takes distribution of a unimodal form regardless of color temperature of lighting for photographing and of the type of photographic film, in the case of an image obtained by photographing an ordinary subject (FIG. 6-a).

In the case of an image obtained through stroboscopic photographing at night, an appearance ratio of density is divided almost equally into a high density side and a low density side. Therefore, histograms for all colors of B, G and R take a bimodal form (FIG. 6-b).

When a specific color (G, for example) is a dominant color to cause a color failure in a subject, the distribution of a bimodal form appears for the color because the appearance ratio of density for the particular color (G, for example) is divided almost equally into high density and low density. and distribution of a unimodal form appears for other colors (B and R, for example) (FIG. 6-c).

As described above, when histograms of secondary image density information for B, G and R colors are analyzed, it is possible to correct an exposure amount selectively as far as a color failure is concerned. In the following step, an example of the analyzing method will be shown.

In step 6, cumulative destribution function $CDF_k(s)$ of secondary image density information relating to each of B, G and R colors of an original can be computed by the following formula (5) from the histograms mentioned above.

$$CDF_k(s) = \sum_{t=0}^{s} f_k(t) \; (k = B, G, R) \qquad (5)$$

Figure 7A:
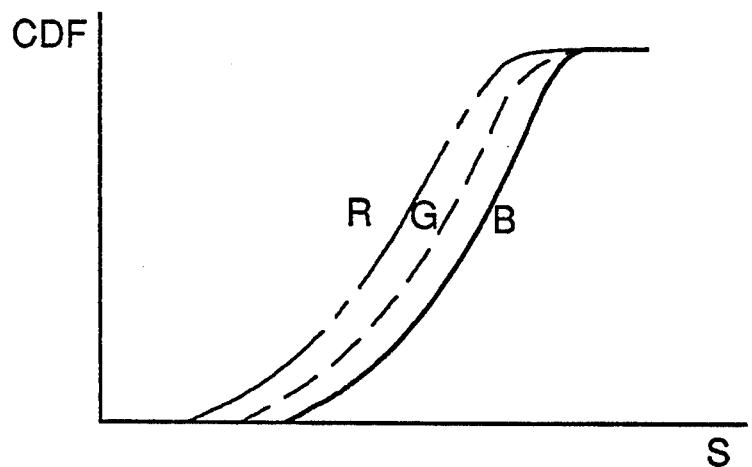
FIG. 7 is a cumulative distribution function for the histogram of image density of each color in each image information.
Figure 7B:
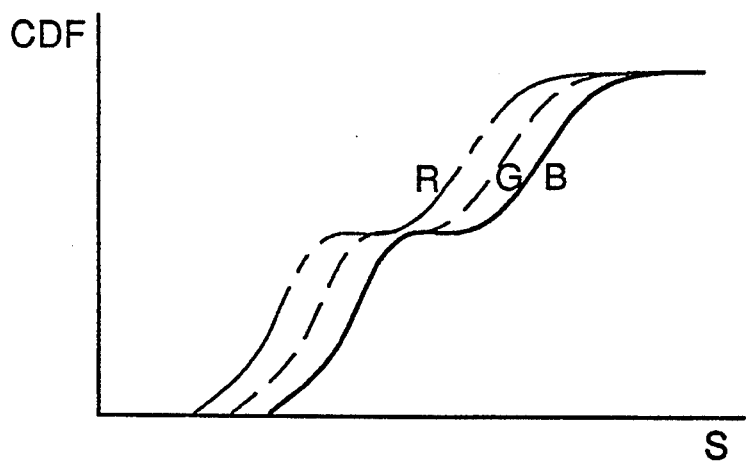
Figure 7C:
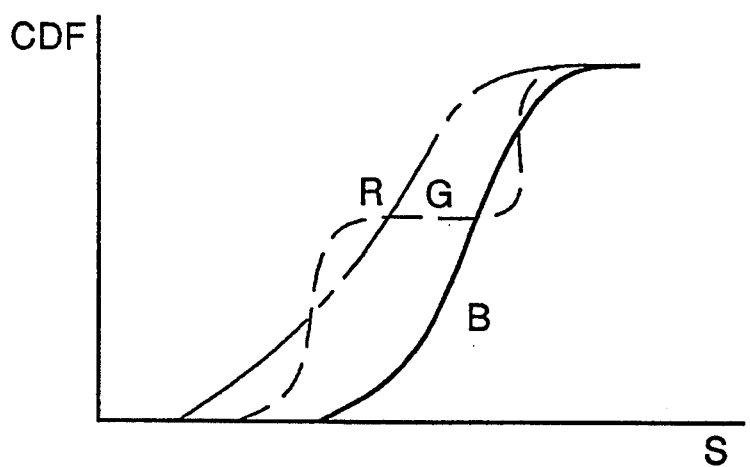

FIG. 7 shows an example of the cumulative distribution function obtained in the above manner. In the figure, the abscissa represents image density s and the ordinate represents its cumulative distribution function CDF. The maximum value of cumulative distribution function CDF, in this case, is the pixel number 256 (16×16 pixels) of secondary image density information.

With regard to the cumulative distribution function obtained in the manner mentioned above, each of B, G and R colors shows almost the same tendency in the case (FIG. 7-a) of an image obtained by photographing an ordinary subject corresponding to FIG. 6-a and in the case (FIG. 7-b) of an image obtained through stroboscopic photographing at night corresponding to FIG. 6-b.

On the other hand, when a specific color (G, for example) is a dominant color to cause a color failure in a subject corresponding to FIG. 6-c (FIG. 7-c), the specific tendency is shown with respect to the specific color (G, for example). This tendency, namely dominance of the specific color in the subject can be evaluated quantitatively by obtaining the correlation among B, G and R in terms of an inverse function of the cumulative distribution function for each of B, G and R colors. As is apparent from formula 4 and the figure, this cumulative distribution function is continuous for a given s and is an increasing monotone function. Therefore, it is easy to obtain an inverse function.

From the cumulative distribution function of the secondary image density information mentioned above, its inverse function can be obtained in step 7 and from the cumulative distribution function relating to each of B, G and R colors corresponding to each original, its inverse function value $U_k(l)$ can be obtained in step 12, both through the following Expression (6).

$$U_k(l) = CDF^{-1}{}_k(l)(k=B, G, R) \qquad (6)$$

In the above expression, l represents a plurality of cumulative distribution function values established in advance and it may be any value from the minimum value of 1 to the maximum value that does not exceed the pixel number of 256 of 2-D image density information. In order to lighten the following processing, however, the cumulative distribution function value may take, for example, a multiple of 8, namely, 8, 16, 24, . . ., 248.

In step 8, a correlation coefficient between colors is computed through the following formula (7) from a line of the inverse function of the cumulative distribution function for each of B, G and R colors obtained in the above manner.

$$\begin{aligned}CC_{BG} &= Cov(U_B, U_G)/\{Var(U_B) \times Var(U_G)\}^{\frac{1}{2}} \\ CC_{GR} &= Cov(U_G, U_R)/\{Var(U_G) \times Var(U_R)\}^{\frac{1}{2}} \\ CC_{RB} &= Cov(U_R, U_B)/\{Var(U_R) \times Var(U_B)\}^{\frac{1}{2}}\end{aligned} \qquad (7)$$

In the above expression, $CC_{BG}$, $CC_{GR}$, and $CC_{RB}$, represent respectively a correlation coefficient among colors of B, G and R in terms of a line of the inverse function of the cumulative distribution function, and Coy represents covariance and Var represents variance.

The correlation coefficient obtained in the above manner reflects a difference of the form of the cumulative distribution function among colors of B, G and R. For example, in the case of an image of a photographed ordinary subject corresponding to FIG. 7a and an image obtained through stroboscopic photographing at night corresponding to FIG. 7b, three correlation coefficients show values which are almost the same.

However, in the case of a color failure (FIG. 7c) wherein the specific color (G, for example) is dominant, the correlation coefficients $CC_{BG}$ and $CC_{GR}$ between the specific color (G, for example) and other colors show a small value compared with other correlation coefficient $CC_{RB}$.

Therefore, it is possible to evaluate the dominating nature of the specific color of the subject mentioned above by the use of an evaluation value that is the minimum value among the aforementioned three correlation coefficients. It is also possible to use a method wherein an evaluation value is a difference between the maximum value and the minimum value, just in case that all of the three correlation coefficients take an extremely small value. In this case, a latter case will be taken.

In step 9, evaluation amount named color dominance level CD for the dominating nature of the specific color of the subject mentioned above is obtained through the following formula (8).

$$CD = Max(CC_{BG}, CC_{GR}, CC_{RB}) - Min(CC_{BG}, CC_{GR}, CC_{RB}) \qquad (8)$$

In step 10, correction level CL related to the correction of an exposure amount at exposure control section 9 is determined based on analyses of secondary image density information. This value may be given with a linear function of the first degree or of the severalfold degree of CD, or it may be determined by a look-up table (LUT) that can be referred by CD so that non-linear conversion, for example, may also be possible. In this case, the latter example will be taken.

$$CL = LUT(CD) \quad (9)$$

Figure 8:
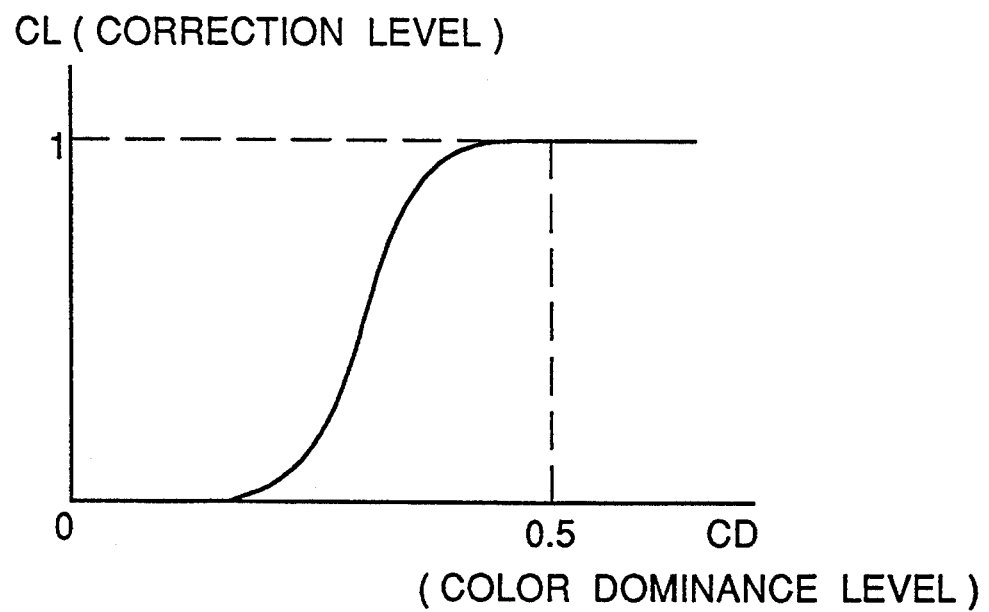
FIG. 8 shows an example of a look-up table that determines a correction level relating to the correction of an exposure amount.

FIG. 8 shows an example of the LUT.

In FIG. 8, the abscissa represents evaluation amount CD of the dominating nature of the specific color, and the ordinate represents correction level CL. In this case, the value of the correction level is in the range from 0 to 1 wherein 0 means that no correction is to be made and 1 means that the maximum correction is to be made.

Since, in general, about 90% of images do not need correction of an exposure amount for adjusting color balance, a value of CL is established so that it takes 0 in many cases in accordance with the above. Incidentally, though the look-up table is stored in memory 37 of image processing unit 11 prior to processing, it may also be adjusted properly by inputting through an unillustrated operation unit or through an auxiliary memory unit.

Though CL is determined through an evaluation amount of one kind relating to the dominating nature of the specific color, in this case, it may also be determined through evaluation quantities of more kinds. As an evaluation amount, in this case, there may be given an example wherein the evaluation value is obtained from the comparison between the standard chromaticity ($X_0$, $Y_0$) obtained from the mean value of 2-D image density information of each of B, G and R colors for a standard image or for multiple images and the chromaticity (X, Y) obtained from the mean value of 2-D image density information of each of B, G and R colors for the images. The chromaticity (X, Y) may be obtained by the following formula (10), for example.

$$X = b \times 3^{1/2} - r \times 3^{1/2}$$
$$Y = b/2 - g + r/2 \quad (10)$$

In the above expression, b, g and r represent respectively the mean value of 2-D image density information of each color of B, G and R. Further, as an evaluation value relating to the dominating nature of the specific color based on chromaticity from the above expression, there may be given saturation chroma SAT and hue HUE shown in the following formula 11.

$$SAT = \{(X - X_0)^2 + (Y - Y_0)^2\}^{\frac{1}{2}}$$
$$HUE = Tan^{-1}\{(Y - Y_0)/(X - X_0)\} \quad (11)$$

Since the dominating nature of the specific color of a subject can be evaluated by a statistical amount of 2-D image density information as described above, each pixel does not necessarily need to be highly accurate. Therefore, it is possible to use an inexpensive element represented by a CCD image sensor in an image pick-up system for image-scanning, and it is also possible to use a simple circuit for signal processing.

In photometry of average transmitted light, it is possible to use a photometric element having a large light-receiving area in general, and thereby it is possible to obtain a dynamic range which is sufficiently large. Therefore, it is possible to use a color-separation filter having a spectral transmissivity property for a narrow band, and it is possible to measure density accurately for a broad range. From the reason mentioned above, there may be obtained signals which are more favorable in terms of color-separation performance and accuracy compared with 2-D image density information obtained from the above-mentioned 2-D image sensor.

Therefore, it is possible to obtain an evaluation amount which is accurate in terms of both color-separation performance and accuracy through the valuation employing photometric values of average transmitted light (density) of photodiodes 8a, 8b and 8c which is conducted in addition to the valuation based on the mean value of 2-D image density information of each color mentioned above. In the above occasion, the mean value of 2-D image density information can naturally be used in combination. In this case, the photometric value is supplied to image processing unit 11 from exposure control section 9 through communication line 12.

When obtaining the evaluation amount, it is enough to employ a method wherein standard chromaticity ($X_0$, $Y_0$) is obtained from an average transmitted light photometric value (density) of each color of B, G and R of a standard image or of many images and this chromaticity is compared with chromaticity (X, Y) obtained from average transmission density information of each color of B, G and R of the images, provided that chromaticity (X, Y) is given by the above Expression (10). Further, as an evaluation amount related to the dominating nature of the specific color based on the chromaticity mentioned above, there may be given saturation SAT and hue HUE indicated by Expression 11.

Correction level CL related to correction of an exposure amount is determined by a plurality of evaluation amounts relating to the dominating nature of the specific color obtained in the above manner. This determination is made by means of the following formula (12).

$$CL = g(P_1, P_2, P_3, \ldots) \quad (12)$$

In the above expression, g represents a function and $P_i$ (i=1, 2, 3, ..., N) represents a plurality of evaluation amounts relating to the dominating nature of the specific color. This function may either be a linear or non-linear mapping extending from N-dimensional space to one-dimensional space or be a theoretical expression.

As described above, the method employing a plurality of evaluation amounts relating to the dominating nature of the specific color is effective when improving reliability and accuracy of correction level CL relating to the correction of an exposure amount.

Density correction value D'' and CL both obtained in the above manner are sent to exposure control section 9 through communication line 12, and are used in correction of exposure amount for photographic printing.

Next, a final method of determining exposure amount for photographic printing at exposure control section 9 will be explained.

An exposure amount for photographic printing is determined by the following formula (13).

$$E_k = LATD_k - LATD_{ok} - C_k + D'' + E_{ok} \quad (13)$$

In the expression mentioned above, $E_k$ represents exposure amount (logarithmic value of exposure time) of each color of B, G and R, $LATD_k$ represents average transmitted light photometric value (density) from an original for printing detected by photodiodes 8a, 8b and 8c at exposure section 3, $LATD_{ok}$ represents average transmitted light photometric value (density) from a standard original, $C_k$ represents a correction amount based on a correction level sent from image processing circuit 11, D" represents a density correction value sent from the image processing circuit, $E_{ok}$ represents exposure amount (logarithmic value of exposure time) established for the standard original, and k represents each color of B, G and R.

In the foregoing, correction amount $C_k$ is obtained through the following formula (14) by the use of correction level CL.

$$C_k = CL \times (LATD_{ok} - ND + ND_o) \qquad (4)$$

In the above expression, ND and $ND_o$ represent respectively an average value relating to B, G and R of $LATD_k$ and $LATD_{ok}$.

In the right side of the formula (14), the value in parentheses takes a high value for a relatively high density component and takes a low value for a relatively low density. Owing to formula (13), therefore, for the original having thereon a background of green thicket, for example, an exposure amount for the G-light-sensitive layer on a photographic paper is reduced and thereby magenta color forming thereon is inhibited, resulting in an excellent color balance regulated.

Incidentally, in the case of an ordinary exposure for photographic printing, the occasion mentioned above is rather exceptional, and in most cases, the value of CL is 0, namely no exposure amount is corrected and most originals are exposed with full correction. Therefore, it is possible to obtain photographic prints which are hardly affected by the difference of characteristics depending on color temperature of lighting for photographing and a type of photographic film.

In the foregoing, the value of $LATD_{ok}$ may also be obtained from average transmitted light photometric value (density) of each color of B, G and R of a standard image or of many images, although $LATD_{ok}$ takes the average transmitted light photometric value (density) from the standard original in the above explanation.

In the manner mentioned above, an exposure amount is obtained based on the average transmitted light photometric value of an original, and is corrected selectively based on a correction level obtained through the consideration of the dominating nature of the specific color on a subject.

Incidentally, photometry of average transmitted light of original I is conducted during exposure. Therefore, variation of an illumination light in the exposure system and density variation caused by image deterioration during exposure can be detected on a real time basis for the adjustment of exposure amount. Therefore, it is possible to reduce an adverse effect by these variations of lighting and density remarkably. Finally, therefore, it is possible to obtain an optimum exposure amount wherein the dominating nature of the specific color on a subject and various variations during exposure are taken into account.

Further, it is possible to use a photometric element having a large light-receiving area for photometry of average transmitted light of an original for each color of B, G and R. Owing to this, a dynamic range that is sufficient for photometry can be obtained, density of original I wherein images are formed over a broad density range on photographic film F capable of recording can be measured accurately and stably, and thus an exposure amount for a photographic original can be obtained with high reproducibility.

Further, since the photometry is conducted independently in the exposure step, it is not necessary to use the scanning step again for print remaking. In this case, when density correction value and correction amount used in the initial printing are stored on the rear side of a photographic print, for example, and when corrections corresponding to these value and amount are inputted in exposure control section 9 for reprinting and print remaking, it is possible to obtain photographic prints identical to those obtained in the initial printing, and it is further possible to conduct print remaking simply and easily if further necessary corrections are inputted.

As described above, in an exposure control method for photographic printing wherein average transmitted light of an original on a photographic film is color-separated for obtaining an average photometric value of each color and an exposure amount for printing is controlled by the average photometric value, the invention is characterized in that analysis and evaluation both related to adjustment of a color balance are conducted based on image information of each color obtained by color-separating and scanning the aforementioned original, and the exposure amount for photographic printing mentioned above is properly corrected by the results of the aforementioned evaluation, thus an exposure amount can be corrected based on a color dominance level relating to dominating nature of a specific color of a subject.

Since the invention is further characterized in that the aforementioned evaluation by means of average photometric value of each color is combined with the above-mentioned analysis and eveluation both related to adjustment of a color balance, it is possible to obtain accurate evaluation backed by high color-separating capability and a broad dynamic range.

As a result, it is possible to obtain photographic prints without being affected by color temperature of photographing lighting and a difference of characteristics depending on a type of a photographic film. Namely, it is possible to determine an exposure amount properly by establishing exposure conditions in advance for each type of a photographic film and by switching no exposure conditions established in advance depending on each type of a photographic film, thus high accuracy and high speed of photographic printing process can be realized simultaneously.

In addition to the foregoing, an exposure amount is obtained from an average transmitted light photometric value of an original and this exposure amount is corrected selectively by statistical amount of 2-D image density information. Therefore, an exposure amount for a photographic original can be determined with high reproducibility even when the photographic original is scanned by a simple and inexpensive image pick-up system. Furthermore, despite variation of an illumination light in the exposure system and deterioration of images during exposure, photographic prints having constant quality can be produced stably and print remaking can be conducted easily, which is an advantageous point.

In terms of a hardware, on the other hand, only addition of an image pick-up unit to a conventional apparatus wherein average transmission density is measured and an exposure amount may be determined is enough, thus, much improvement of processing steps can be realized with a minimum economic burden. In addition to that, functions of the conventional printing apparatus can also be utilized as before without taking any action.

Therefore, it is possible to produce stably photographic prints having constant quality for all of fist cycle print, reprinting and print remaking regardless of variation of characteristics of photographic films and an increase of the number of types thereof, which leads to great effect of remarkable rationalization and high efficiency of photographic processing steps.

What is claimed is:

1. An exposure control method for printing an original image from a single image of a frame of a photographic film on a photographic paper, comprising the steps of:
    (a) uniformly illuminating the single frame of the original image on the photographic film;
    (b) color-separating transmitted light from the illuminated single frame of photographic film into a plurality of colors;
    (c) obtaining an average photometric value of the original image of the single frame for each color by measuring the color-separated plurality of colors;
    (d) determining a tentative exposure amount for each color based on the obtained average photometric value for each color;
    (e) obtaining image information by a color-separated scanning of the original image of the single frame, the image information including image density data that represents a two-dimensional density distribution for each color;
    (f) evaluating color dominancy in the original image of the single frame by analyzing the image information obtained by said color-separated scanning of the original image;
    (g) determining an exposure correction level based on results obtained in the evaluating step;
    (h) correcting the tentative exposure amount to a corrected amount based on the determined exposure correction level; and
    (i) controlling an exposure amount to be the corrected amount.

2. The method of claim 1, wherein:
    color dominancy is further evaluated by an analysis of average photometric values; and
    an exposure correction level is determined by combining evaluation results of the analysis of the image information and evaluation results of an analysis of the average photometric values.

3. The method of claim 1, wherein color dominancy is evaluated by the steps of:
    obtaining a cumulative distribution function data of the image density data for each color; and
    the step of evaluating the color dominancy is based on an analysis of the cumulative distribution function data for each color.

4. The method of claim 1, further comprising:
    obtaining a histogram which shows a frequency of the image density data for each color; and
    the step of evaluating the color dominancy comprises analyzing the histogram for each color.

5. The method of claim 1, wherein the color dominancy is evaluated by the steps of:
    obtaining a correlation which shows a relationship between the image density data for each colors; and
    the step of evaluating the color dominancy is based on an analysis of the correlation for each color.

6. The method of claim 1, further comprising:
    obtaining a variance of the image density data for each color of each frame; and
    the step of evaluating the color dominancy comprises analyzing the image density variance for each color of each frame.

7. The method of claim 1, wherein the step of obtaining an average photometric value and the step of obtaining image information by a color-separated scanning of the original image occur at different times.

* * * * *